C. W. PRICE.
CAR DOOR HANGER.
APPLICATION FILED MAR. 28, 1912.
1,078,954. Patented Nov. 18, 1913.
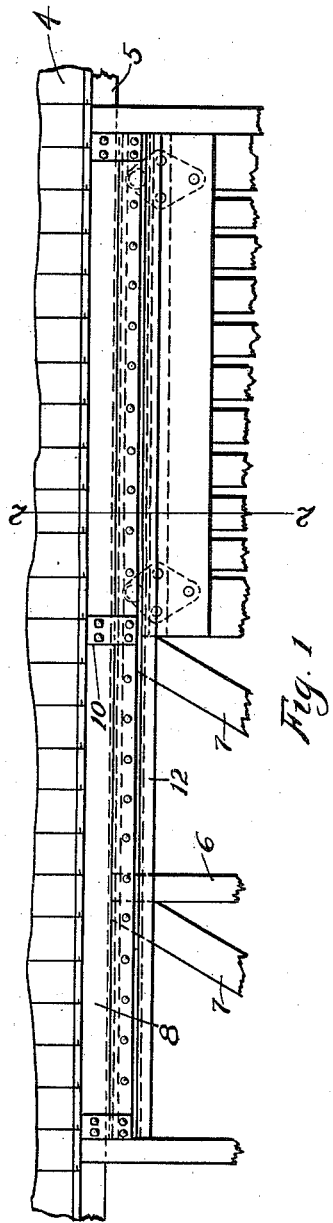
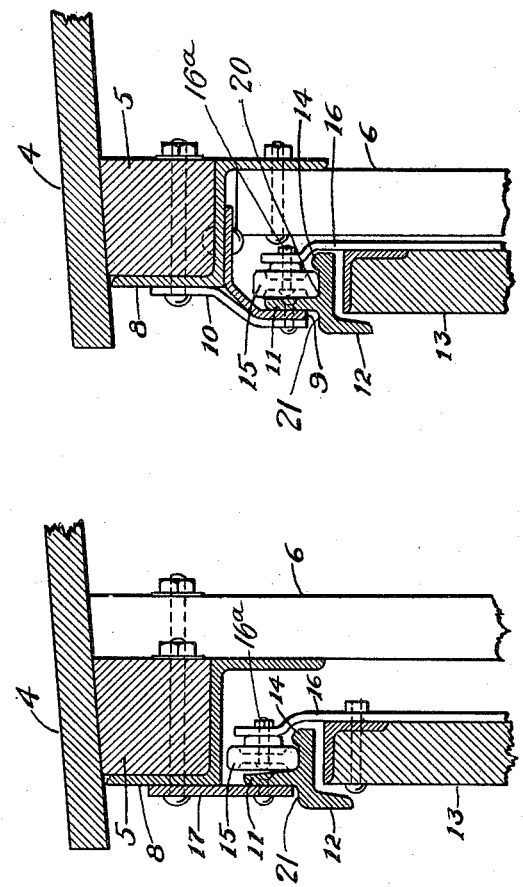
WITNESSES
INVENTOR
Charles W. Price
BY
J. H. Gibbs
ATTORNEY

UNITED STATES PATENT OFFICE.

CHARLES W. PRICE, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

CAR-DOOR HANGER.

1,078,954. Specification of Letters Patent. Patented Nov. 18, 1913.

Application filed March 28, 1912. Serial No. 686,935.

*To all whom it may concern:*

Be it known that I, CHARLES W. PRICE, residing at St. Louis, Missouri, and being a citizen of the United States, have invented certain new and useful Improvements in Car-Door Hangers, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 represents a fragmental side view of a car showing an adaptation of the preferred form of my invention. Fig. 2 shows a section on line 2—2 of Fig. 1, wherein the side bracing of the car is on the outside of the car wall, which is the usual standard construction. Fig. 3 shows a similar section adapted to a car wherein the side bracing is on the inside of the car wall, the car wall being interposed between the door and the bracing.

The invention relates to certain new and useful improvements in door hoods and door hangers for railroad cars, as adapted to that class of car having overlapping eaves wherein the side door slides longitudinally of the car.

It also utilizes a new and useful door tread, as will be more fully set forth in the description of the mechanical details illustrated in the accompanying drawings.

4 designates the roof, 5 the roof plate, 6 the side post and 7 the oblique bracing of usual construction.

The roof plate 5 is supported within a Z-shaped side plate casing 8, to which are suitably secured the side posts 6. Below side plate 8 is an angularly arranged hood piece 9, extending the full length of the door slide, protecting the door pocket and held in position against the underside of the side plate 8 in suitable manner, as by rivets. The outer or downwardly projecting flange of this hood piece 9 is preferably arranged parallel to the side walls of the car, and is adapted to receive a fastening device for the door tread. The hood piece 9 is reinforced at intervals by a brace 10 secured to the casing to prevent the sagging of the downwardly extending flange under the weight of the door.

The door tread is preferably formed integrally and comprises an upwardly projecting securing flange 11, being adapted to secure the tread to the downwardly projecting flange of the hood piece 9, the outer portion of the track being provided with projecting flange 12 over-hanging and forming a hood for the door 13 proper, and the inner end of the track member forming the tread flange has an upwardly projecting beading 14 to form the inner side of the tread and prevent the door wheel 15 from leaving the track. To prevent binding between the door wheel 15 and the securing flange 11 the said flange is tapered from a point near the tread flange to its upper edge.

The door 13 is carried on the axle of the door wheel 15 by a suitable hanger 16, located on the inside of the wheel.

In Fig. 3 where the car wall is shown as outside of the post, 17 is a plate secured to the side plate 8 and depending therefrom, for a purpose soon to be described.

The track for the door hanger is formed of a single rolled section of metal of the cross-sectional contour illustrated in Figs. 2 and 3, in which the upstanding flange 11 is of less thickness at its upper end than where it joins the tread portion 20. The tread portion 20 of the track is substantially flat at its middle portion, thereby providing a suitable bearing surface for the door hanger wheels 15, which are connected by means of the hanger pintles 16ª and hanger strap 16 with a sliding car door.

As is well known, this class of doors is commonly subjected to more or less rough usage, and to guide the hanger wheels on the tread portion of the track said track is provided with the beading 14.

As it is desirable to support the door as near the track as practicable, the lower side of the track is formed in a plane surface, except for the flange 12, which extends downwardly outside of the door and serves as an outside guide therefor. Thus the single rolled section forming the track is provided with a vertically extending supporting flange 11, a flat and horizontal tread surface 21, a beading 14 adapted to serve as a wheel guide, an outwardly projecting shoulder 21, and a guide flange 12 adapted to retain the door 13 in its proper operative position.

The construction herein shown and described, which is peculiarly adapted to the particular form of cars herein described, may of course, be adapted to the other form of cars, such as freight or baggage cars.

Having now described the constructional details of my device, what I claim as new and desire to secure by Letters Patent is—

1. In a car door hanger, a suitable support, in combination with an integral track member provided with a vertical securing flange intermediate its width, a shoulder at one side of said flange, a guide flange depending below said shoulder, and a horizontal tread portion projecting from the opposite side of said vertical flange.

2. In a car door hanger, a suitable support, in combination with an integral track member provided with a vertical securing flange intermediate its width, a shoulder at one side of said flange, a guide flange depending below said shoulder, and a flat tread portion terminating in a guide bead projecting from the opposite side of said vertical flange.

3. In a car door hanger, the combination of a supporting hood member and a track member secured to and depending within the supporting hood, said track member being formed as an integer and comprising a vertical flange intermediate its horizontal width, a horizontal tread portion formed with a guide, and an outer shoulder terminating in a vertically depending door guiding flange.

In witness whereof I have hereunto set my hand in the presence of two witnesses.

CHARLES W. PRICE.

Witnesses:
EDW. J. LONERGAN,
J. W. STEINMEYER.

Copies of this patent may be obtained for five cents each, by addressing the "Commissioner of Patents, Washington, D. C."